United States Patent
Hughes et al.

(10) Patent No.: US 10,775,041 B2
(45) Date of Patent: Sep. 15, 2020

(54) SYSTEM AND METHOD FOR OXYGEN CARRIER ASSISTED OXY-FIRED FLUIDIZED BED COMBUSTION

(71) Applicant: Her Majesty the Queen in Right of Canada as Represented by the Minister of Natural Resources, Ottawa (CA)

(72) Inventors: Robin W. Hughes, Ottawa (CA); Dennis Y. Lu, Ottawa (CA); Robert T. Symonds, Gatineau (CA); Firas N. Ridha, Ottawa (CA)

(73) Assignee: HER MAJESTY THE QUEEN IN RIGHT OF CANADA AS REPRESENTED BY THE MINISTER OF NATURAL RESOURCES, Ottawa (CA)

( * ) Notice: Subject to any disclaimer, the term of this patent is extended or adjusted under 35 U.S.C. 154(b) by 158 days.

(21) Appl. No.: 16/083,060

(22) PCT Filed: Mar. 24, 2017

(86) PCT No.: PCT/CA2017/050372
§ 371 (c)(1),
(2) Date: Sep. 7, 2018

(87) PCT Pub. No.: WO2017/161460
PCT Pub. Date: Sep. 28, 2017

(65) Prior Publication Data
US 2019/0093882 A1    Mar. 28, 2019

Related U.S. Application Data

(60) Provisional application No. 62/312,764, filed on Mar. 24, 2016.

(51) Int. Cl.
*F23C 13/08* (2006.01)
*F23L 7/00* (2006.01)
(Continued)

(52) U.S. Cl.
CPC ............. *F23C 13/08* (2013.01); *F23C 9/06* (2013.01); *F23C 9/08* (2013.01); *F23C 10/00* (2013.01);
(Continued)

(58) Field of Classification Search
CPC .......... F23C 10/22; F23C 10/01; F23C 13/08; F23C 10/28; F23C 2206/102;
(Continued)

(56) References Cited

U.S. PATENT DOCUMENTS 3,066,017 A    11/1962  Jahnig
3,508,506 A     4/1970  Bishop
(Continued)

FOREIGN PATENT DOCUMENTS

WO    2009017972 A2    2/2009

OTHER PUBLICATIONS

International Search Report and Written Opinion for Application No. PCT/CA2017/050372, dated Jun. 27, 2017, 10 pages.
(Continued)

*Primary Examiner* — Alfred Basichas
(74) *Attorney, Agent, or Firm* — Hoffman Warnick LLC

(57) ABSTRACT

An oxygen fired fluidized bed combustor system (Oxy-FBC) is provided. The system provides means of producing a nearly pure stream of carbon dioxide for storage at high efficiency by controlling the oxygen content within certain regions of the combustor to control the rate of heat release allowing efficient transfer of heat from the combustor to the boiler tubes while avoiding excessively high temperatures that will cause ash melting, and simultaneously remove
(Continued)

sulphur from the combustor via sorbents such as limestone and dolomite. The present invention utilizes a coarse oxygen carrier bed material to distribute heat and oxygen throughout an Oxy-FBC, while injecting fine sulphur sorbent that will continuously be removed from the bed.

20 Claims, 8 Drawing Sheets

(51) Int. Cl.
| F23C 10/16 | (2006.01) |
| F23J 7/00 | (2006.01) |
| F27D 17/00 | (2006.01) |
| F27D 99/00 | (2010.01) |
| F23C 10/00 | (2006.01) |
| F23C 9/08 | (2006.01) |
| F23G 5/30 | (2006.01) |
| F27B 15/02 | (2006.01) |
| F23J 9/00 | (2006.01) |
| F23C 9/06 | (2006.01) |
| F23C 10/01 | (2006.01) |
| F23C 10/04 | (2006.01) |
| F23C 10/22 | (2006.01) |
| F23C 10/28 | (2006.01) |

(52) U.S. Cl.
CPC .............. *F23C 10/01* (2013.01); *F23C 10/04* (2013.01); *F23C 10/16* (2013.01); *F23C 10/22* (2013.01); *F23C 10/28* (2013.01); *F23G 5/30* (2013.01); *F23J 7/00* (2013.01); *F23J 9/00* (2013.01); *F23L 7/00* (2013.01); *F27B 15/02* (2013.01); *F27D 17/004* (2013.01); *F27D 99/0033* (2013.01); *F23C 2206/102* (2013.01); *F23C 2900/99008* (2013.01); *F23J 2215/20* (2013.01); *Y02E 20/346* (2013.01); *Y02P 10/122* (2015.11); *Y02P 10/126* (2015.11); *Y02P 10/143* (2015.11)

(58) Field of Classification Search
CPC .... F23C 2900/99008; F23C 9/08; F23C 9/06; F23C 10/16; F23C 10/00; F23C 10/04; F27D 99/0033; F27D 17/004; F23G 5/30; F23L 7/00; Y02E 20/346; F23J 2215/20; F23J 9/00; F23J 7/00; Y02P 10/143; Y02P 10/126; Y02P 10/122
See application file for complete search history.

(56) References Cited

U.S. PATENT DOCUMENTS

| 4,084,545 | A | 4/1978 | Nack et al. |
| 5,535,687 | A | 7/1996 | Khanna |
| 6,505,567 | B1 | 1/2003 | Anderson et al. |
| 9,109,167 | B2 | 8/2015 | Guillou et al. |
| 2009/0020405 | A1* | 1/2009 | Fan .................... B01J 20/06 201/12 |
| 2011/0129408 | A1* | 6/2011 | Jadhav ............... F23C 99/00 423/437.1 |
| 2013/0118076 | A1 | 5/2013 | Guillou et al. |
| 2014/0369908 | A1* | 12/2014 | Reardon ............... B01D 53/83 423/210 |
| 2016/0017799 | A1 | 1/2016 | Hoteit et al. |

OTHER PUBLICATIONS

European Search Report for Application No. 17769223.3, dated Aug. 30, 2019, 7 pages.

\* cited by examiner

SYSTEM AND METHOD FOR OXYGEN CARRIER ASSISTED OXY-FIRED FLUIDIZED BED COMBUSTION

FIELD OF THE INVENTION

The invention relates to oxygen fired fluidized bed combusting system. The system is used to combust fuel to generate heat for use in applications such as steam and power production, while producing a pure stream of carbon dioxide that can be geologically sequestered thereby avoiding the emission of greenhouse gases and pollutants including sulphur oxides, nitrogen oxides, fine particulates, and trace elements to the atmosphere. The system and method disclosed herein incorporates an oxygen carrier and sulphur capture to enhance combustion performance.

BACKGROUND OF THE INVENTION

Increase in $CO_2$ emissions, such as the combustion of fossil fuels, has contributed to climate change. As a result, measures to reduce $CO_2$ emissions are needed. Carbon capture and storage (CCS) has been proposed as a major climate change mitigation technology that may capture up to 90% of the $CO_2$ emissions from fossil fuel-fired facilities.

CCS processes consist of three stages: $CO_2$ capture, transportation, and storage. The first stage is the most challenging due to the high cost of currently available technolgies.

Oxy-fuel combustion is a technology used for capturing $CO_2$ from large-scale fossil fuel-fired facilities with the potential to reduce $CO_2$ emissions and meet CCS requirements. In oxy-fuel combustion, fuel is combusted in $O_2/CO_2$ atmosphere producing a $CO_2$-rich flue gas with some impurities such as $SO_x$, $NO_x$, Hg and $H_2O$. When the combustion proceeds with a fluidized bed system, such as oxy-FBC (fluidized bed combustion), there are inherent advantages, e.g., fuel flexibility, moderate combustion temperature, and low impurity generation. Further, fluidized bed configuration enables in-situ $SO_2$ capture via sulphur removing sorbents, such as limestone or dolomite, resulting in reduced corrosion risk to system components caused by acid attack after the formation of $SO_3$ at high partial pressures of $SO_2$ and steam.

Oxy-fuel fluidized bed combustion has been shown to be a clean energy technology that can utilize a variety of fuels for producing steam and electrical power and is now demonstrated at the 30 $MW_{th}$ scale and is available at the 330 MWe scale for demonstration. The pure stream of carbon dioxide that can be geologically sequestered; thereby, eliminating the emission of greenhouse gases resulting from combustion of fuels.

There still remain certain drawbacks with the current oxy-fuel fluidized bed combustion technology.

Typically, oxy-fuel fuel combustors use recycled flue gas to provide fluidizing gas and to provide a temperature moderator within the combustor. This flue gas stream requires substantial capital investment and imposes a significant parasitic power loss on the combustor facility.

A major portion of the heat released during combustion is extracted using an in-bed heat exchanger (located within the fluidized bed). Conventional fluidized bed combustion technologies use inert solid particulate substances as the bed material or calcium bearing sulphur capture sorbents. Over time the bed material attrites and forms finer material that is blown out of the fluidized bed, and at which time a bed material replenishment system is required.

While fluidized bed combustors are considered to exhibit good mixing characteristics, they do not mix gases radially to the extent as desired, resulting in regions in the fluidized bed where reducing conditions prevail. The reducing zones result in increased emissions of carbon monoxide and other deleterious impurities and cause corrosion to the boiler components such as boiler tubes, tube supports, and injection ports. For example, there can be localized regions where there is insufficient oxygen to fully combust the fuel. The products of incomplete combustion include the products of complete combustion, as well as a variety of reduced species including hydrogen ($H_2$), carbon monoxide (CO), hydrogen sulphide ($H_2S$), methane ($CH_4$), higher hydrocarbons, and ammonia ($NH_3$). These species are not desirable in the flue gas of a combustor. It is possible for these species, if in sufficient quantity, to later mix with oxygen resulting in explosions within the downstream equipment. The metal alloys used in components in the combustor typically have a protective oxide layer that prevents corrosion (stainless steel is 'stainless' due to this oxide layer); however, these species are able to reduce the metal oxide layer thereby eliminating the protective layer resulting in corrosion of the components. Corrosion of these components can result in increased erosion rates and component failure. Incomplete combustion reduces the amount of heat that can be recovered from the combustor, since a portion of the fuel has not been burnt and therefore the overall efficiency of the system is reduced. Sulphur removal sorbent performs best when sulphur oxides and oxygen are present. A number of the reduced species can reduce the effectiveness of the $CO_2$ processing unit since the removal of these impurities is required to meet pipeline specifications.

To limit or avoid localized regions with insufficient oxygen, large scale combustors incorporate a multitude of fuel and oxidant injection points. As the number of injection points increases, the cost and complexity of the combustion system also increase.

Several studies have focused on improving fluidized bed combustion processes using reactive bed materials. These improvements include reduced emissions of unburned hydrocarbons, enhanced sulphur capture, improved $NO_x$ reduction, increased agglomeration resistance, and reduced corrosion issues.

For example, U.S. Pat. No. 4,084,545 (Nack et al.) describes a method of operating a fluidized bed combustion system comprising an entrained fluidized bed of fine particles part of which also contains a non-entrained fluidized bed portion of coarse particles. The fine particles pass out of the bed with the fluidizing gas, pass through a gas-particle separation device and are then re-entrained into the lower portion of the entrained bed. The coarse particles are retained in the fluidized bed. The fine particles are suggested to be hematite ore, limestone, aluminum oxide, nickel or nickel oxide with their primary purpose being rapid heat transfer to boiler components. It is recognized that redox reactions may occur if the bed material contains iron or nickel though the material has not been selected to enhance this effect. It is also recognized that calcium containing compounds can be used to capture sulfur species. This patent discusses an air-fired combustion system operating at approximately atmospheric pressure. The fluidizing gas is indicated to be in the range 6-12 meters per second which exceeds reasonable limits required to avoid boiler tube erosion in a fluidized bed combustion system with velocities less than about 1.2 meters per second being most appropriate. The high fluidizing velocity has in part been specified due to the fairly large size of the fine particles (420 to 841 micron). It is assumed that the fine particulates will be recycled into the entrained bed, but this patent provides no method of separating fuel ash components from the intended Still, there remains the need to address the drawback and risks associated with the current state of art as summarized below in Table 1.

TABLE 1

Risks of Oxy-Fluidized Bed Combustion Systems and Mitigation Measures

| Risks associated with the Current State of Art In Oxy-Fluidized Bed Combustion | Conventional Mitigation Measures |
| --- | --- |
| Sulphur capture using calcium based sorbents is insufficient to meet $CO_2$ transportation specifications | Change sorbent particle size, change sorbent source, use alternate sulphur capture technology Increased $O_2$ partial pressure will enhance sorbent sulphur capture |
| Agglomeration, deposition and fouling of ash and sorbent on boiler tubes and process equipment | Change recycle gas ratio to control temperature of the combustor, change oxygen staging to avoid reducing conditions in regions that are affected More uniform combustion would minimize local "reducing environment" and "hotspots," reducing the risk of agglomeration, deposition and fouling |
| Corrosion and erosion of fuel injection components and boiler tubes | Dependent on local $O_2$ partial pressure - therefore fuel injection and dispersion test work to ensure $O_2$ partial pressure controlled Materials of construction Modify geometry to reduce particle velocities in affected areas | fine particles used for heat transfer. The purpose of the coarse bed particles is to restrict the movement of the coal particles in the principal direction of air flow as to increase the residence time of the coal particles. The coarse particles are specified to be chemically stable (i.e. inert).

U.S. Pat. No. 4,154,581 (Nack et al.) provides an extension to U.S. Pat. No. 4,084,545 through the inclusion of a baffle in the dense bed region to separate the bed into two separate regions operating at differing temperatures to promote the adsorption of sulphur by a calcium bearing sorbent at one temperature while promoting the rate of combustion at the second temperature, although not addressing the other drawbacks of the '545 patent as noted above.

I Adanez-Rubio et al. (*Fuel Processing Technology*, 2014, 124, 104-114) described a system for oxidizing biomass through the use of chemical looping with dual fluidized beds in which one bed acts as an oxygen carrier oxidizer (the air reactor) and one bed gasifies the biomass (the fuel reactor).

Thunman et al. (*Fuel*, 2013, 113, 300-309) found that by introducing ilmenite (Fe—Ti based oxygen carrier) to a 12 MWth circulating fluidized bed (CFB) boiler for biomass combustion, the concentrations of CO, NO, and hydrocarbon were reduced significantly. This was attributed to enhanced oxygen distribution throughout the bed via intermittent reduction and oxidation of ilmenite causing variations in oxygen partial pressures in different regions of the combustor.

Corcoran et al. (*Energy Fuels*, 2014, 28, 7672-7679) noted that the structure of ilmenite particles injected into a CFB boiler for biomass combustion experienced structural and chemical changes due to the diffusion of potassium from ash into the core of the ilmenite particles. This was found to improve the bed material agglomeration resistance and reduce corrosion issues.

D. R. Chadeesingh et al. (*Fuel*, 2014, 127, 169-177) discussed that the introduction of an iron-based oxygen carrier into a bubbling fluidized bed for $CH_4$ combustion with air has also been shown to accelerate the combustion of $CH_4$, CO and $H_2$.

As can be readily appreciated by a person skilled in the art, there is a trade-off in technical and economic performance of the system based on the ability of the system to transfer sufficient oxygen to complete combustion throughout the combustion region.

It is desirable then to develop a technology which meets this objective without substantially affecting cost or reliability of the system.

While oxy-FBC technology operating at atmospheric pressure has been a technical success, the cost of power is still seen as a barrier to deployment of the technology.

To reduce cost and increase efficiency of oxy-fuel systems, pressurized oxy-combustion technologies are being developed that will have efficiencies 15 to 25% higher than their atmospheric pressure equivalents, reducing the cost of power of at least 20% for power generation with CCS.

As a result, there remains the need to reduce the size of the recycle stream which will improve the economic outlook for deploying oxy-solid fuel combustors technology.

SUMMARY OF THE INVENTION

The oxygen fired fluidized bed combustor system (Oxy-FBC) as disclosed in the present invention provides means of producing a nearly pure stream of carbon dioxide for storage at high efficiency by controlling the oxygen content within certain regions of the combustor to control the rate of heat release allowing efficient transfer of heat from the combustor to the boiler tubes while avoiding excessively high temperatures that will cause ash melting, and simultaneously remove sulphur from the combustor via sorbents such as limestone and dolomite. This is achieved by the separation of reducing zones in Oxy-FBC from the boiler tubes, turbulent mixing in the fluidized bed, multiple fuel injection ports and reduced recycle flue gas flow rates.

The present invention utilizes a coarse oxygen carrier bed material to distribute heat and oxygen throughout an Oxy-FBC, while injecting fine sulphur sorbent that will continuously be removed from the bed.

In the present invention, two sizes and types of bed material in an Oxy-FBC are used:

(1) Coarse material—oxygen carrier type: This type of materials are used to distribute oxygen throughout the fluidized bed to reduce or eliminate the presence of reducing zones within the fluidized bed thereby reducing metal corrosion and the production of the emission of flue gas impurities such as carbon monoxide (others listed above). In regions of high oxygen content, the oxygen carrier will be oxidized. In reducing regions, the oxygen carrier will be reduced. The oxidation and reduction reactions facilitate heat distribution throughout the fluidized bed. This type of coarse materials has a higher minimum transport velocity than the fine material, as discussed below, and remains within the fluidized bed for an extended period of time allowing long term use of the oxygen carrier.

(2) Fine material—sulphur sorbent type: This type of materials can be finely divided limestone, dolomite or other suitable sorbents. They are used for the removal of sulphur species within the fluidized bed. This type of sulphated fine material is elutriated from the bed and subsequently removed from the flue gas, thereby reducing deleterious effects with having high sulphur concentrations within the PFBC flue gas during cooling and condensation steps.

The invention further discloses a process for obtaining heat from combustion of a hydrocarbon fuel in the combustion chamber comprising a fluidized bed material. The process comprises introducing of hydrocarbon fuel and oxygen into the combustion chamber; introducing a sorbent into the combustion chamber wherein said sorbent is capable of adsorbing sulphur containing compounds; producing a gas stream consisting primarily of carbon dioxide and water by combustion of the hydrocarbon fuel; and transferring the heat produced by the combustion of the hydrocarbon fuel out of the combustion chamber.

According to one aspect of the invention, it is directed to a process for obtaining heat from combustion of a fuel comprising the steps of:

i) providing a combustion chamber comprising a fluidized bed material and means for transferring heat out of the combustion chamber;
ii) introducing the fuel and a gas into the combustion chamber;
iii) introducing a sorbent into the combustion chamber wherein said sorbent is capable of adsorbing sulphur containing compounds;
iv) producing a gas stream comprising primarily of $CO_2$ and $H_2O$ by combustion of the fuel; and
v) transferring the heat produced by the combustion of the fuel out of the combustion chamber;
wherein the bed material comprises at least a first material comprising particles having a first minimum transport velocity and a second material comprising particles having a second minimum transport velocity, and wherein the minimum transport velocity of the particles of the first material is greater than the minimum transport velocity of the particles of the second material;
wherein the first material comprises an oxygen carrier capable of transferring oxygen to and from the gases in the combustion chamber generated by the localized or distributed partial oxidation of the fuel;
wherein the second material comprises the sorbent;
wherein the gas introduced into the combustion chamber comprises oxygen and a moderating gas; and
wherein introduction of the gas into the combustion chambers fluidizes the bed material and elutriates a portion of the sorbent.

According to another aspect of the invention, it is directed to an apparatus for combustion of a fuel comprising:

i) a combustion chamber;
ii) a bed material comprising at least a first material and a second material;
iii) means for introducing oxygen into the combustion chamber with or without a moderating gas;
iv) means for introducing the fuel into the combustion chamber;
v) means for capturing carbon dioxide gas produced in the combustion chamber;
vi) means for transferring heat produced by combustion of the fuel out of the combustion chamber;
vii) means for introducing the first material and the second material into the combustion chamber; and
viii) means for removing a portion of the second material which is elutriated by the gas introduced into the chamber;
wherein the first material comprises particles having a first minimum transport velocity and the second material comprising particles having a second minimum transport velocity, and wherein the minimum transport velocity of the particles of the first material is greater than the minimum transport velocity of the particles of the second material;
wherein the first material comprises an oxygen carrier capable of transferring oxygen to and from gases in the combustion chamber generated by the localized or distributed partial oxidation of the hydrocarbon fuel;
wherein the second material comprises a sorbent which is capable of adsorbing sulphur containing compounds; and
wherein the means for introducing the oxygen and optionally the moderating gas is arranged such that introduction of the oxygen and optionally the moderating gas into the combustion chamber fluidizes the bed material and elutriates the portion of the second material.

In contrast to the current state of art, the present invention uses an oxygen-fired process, as opposed to simply air-fired, and can operate under atmospheric pressure and elevated pressure (as opposed to only under atmospheric pressure). The coarse bed material used in the present invention is selected to undergo redox reactions rapidly. In terms of fluidizing velocity, lower fluidizing velocity (<3 meters per second) is achieved. Furthermore, fine particles are not recycled allowing separation of ash components from material retained without the need for an additional processing step.

Other features and advantages of the present invention will become apparent from the following detailed description and the accompanying drawings, which illustrate, by way of example, the principles of the invention.

BRIEF DESCRIPTION OF THE DRAWINGS

By way of example only, preferred embodiments of the present invention are described hereinafter with reference to the accompanying drawings, wherein.

DETAILED DESCRIPTION OF THE INVENTION

Figure 1:
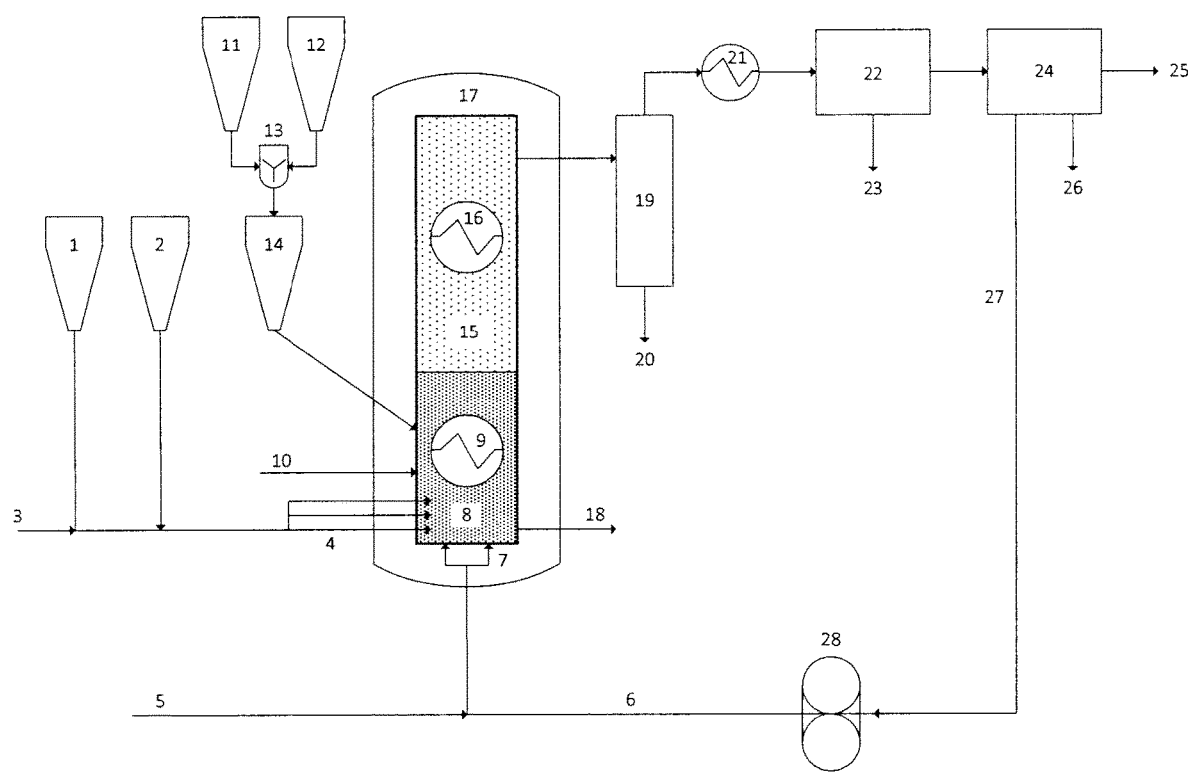
FIG. 1 is a schematic representation of an embodiment of the invention.

A pressurized fluidized bed combustion system is disclosed herein (the present invention can be applied to both atmospheric pressure and elevated pressure combustors). The system is used to combust fuel to generate heat for use in applications such as steam and power production, while producing a pure stream of carbon dioxide that can be geologically sequestered, thereby avoiding the emission of greenhouse gases and pollutants including sulphur oxides, nitrogen oxides, fine particulates, and trace elements to the atmosphere.

According to the present invention, the inputs to the technology are fuel, oxygen, a sulphur removal sorbent, inert bed material, and a material that can be repeatedly oxidized and reduced within the combustor (oxygen carrier).

As described hereinabove, the present invention utilizes a first material, which is coarse oxygen carrier bed material to distribute heat and oxygen throughout an Oxy-FBC, while injecting a second material, for example, a fine sulphur sorbent, that will continuously be removed from the bed.

According to the present invention, the fluidized bed material comprises at least (1) a first material comprising particles having a first average size and (2) a second material comprising particles having a second average size, and wherein the average size of the particles of the first material is greater than the average size of the particles of the second material.

The first material comprises a metal oxygen carrier capable of transferring oxygen to and from the gases in the combustion chamber generated by the localized or distributed partial oxidation of the hydrocarbon fuel and the second material comprises the sorbent.

Wherein the gas introduced into the combustion chamber comprises oxygen and a moderating gas which fluidizes the bed material and elutriates a portion of the sorbent.

Non-limiting illustrative examples of the materials used for the invention are shown in Table 2.

TABLE 2

Non-Limiting Illustrative Examples of Materials used for the Present Invention

| Reactant Type | Non-Limiting Illustrative Examples of Materials |
| --- | --- |
| Fuel | Pulverized - fine material: Coal, petroleum coke, biomass, waste products, gaseous hydrocarbons, etc. |

TABLE 2-continued

Non-Limiting Illustrative Examples of Materials used for the Present Invention

| Reactant Type | Non-Limiting Illustrative Examples of Materials |
| --- | --- |
| Sulphur removal sorbent | Pulverized - fine material: Limestone, lime, calcium hydroxide, dolomite (calcium and magnesium bearing rock), etc. |
| Inert bed material | Crushed - coarse material: Sand, ash, olivine, etc. |
| Oxygen carrier | Crushed - coarse material: Natural and synthetic materials Ilmenite (iron-titanium ore), synthetic materials composed of Ni, Cu, Mg, Fe, Mn, on alumina, silica, etc. |

With regard to the oxygen carrier, it is preferable that the heat of reaction is endothermic when it is reduced.

In another preferred embodiment, the oxygen carrier is attrition resistant.

In another preferred embodiment, the oxygen carrier is resistant to poisoning by the fuel constituents including ash and sulphur species.

The fuel and the sulphur removal sorbent are injected, at atmospheric or elevated pressure, into the oxygen fired fluidized bed combustor using a motive or moderating gas that pneumatically conveys them through a multitude of injectors. The motive or moderating gas can be purified carbon dioxide generated within the $CO_2$ processing unit.

Oxygen ($O_2$), at atmospheric or elevated pressure, is combined with recycled flue gas primarily composed of carbon dioxide ($CO_2$). Mixing of the $O_2$ with recycled flue gas is done to avoid localized hot spots within the combustor; injection of pure oxygen without moderating gas may result in temperatures above the melting point of the materials and process equipment causing process failure.

The mixture of oxygen and recycled flue gas passes through a distributor at the bottom of the fluidized bed of the oxygen fired pressurized fluidized bed combustor.

The fuel and oxygen mix within the combustor resulting in the fuel burning releasing heat during the process. In general, the products of the complete combustion of the fuels are carbon dioxide ($CO_2$), water ($H_2O$), sulphur dioxide ($SO_2$), sulphur trioxide ($SO_3$), nitrogen dioxide ($NO_2$), nitrogen monoxide (NO), and nitrous oxide ($N_2O$).

When combined with water in the presence of oxygen, the sulphur species can form sulphuric acid ($H_2SO_4$).

It is desirable to remove the sulphur species within the combustor in order to avoid corrosion of the components via acid attack. This can, in part, be done through the use of the sulphur removal sorbent.

In the present invention, calcium-bearing materials are used to react with the sulphur species in the presence of oxygen to form calcium sulphate ($CaSO_4$).

In a preferred embodiment, the sulphur removal sorbent is pulverized to enhance the rate of reaction and to maintain local sulphur species at low levels, thereby avoiding localized corrosion. Since the sulphur removal sorbent is fine in particle size, it will be continuously blown into the freeboard and consequently blown out of the combustor.

Many of the fuels used in the technology contain ash; this ash is very fine in particle size and is blown into the freeboard and out of the combustor, along with the sulphur sorbent.

The present invention uses a fluidized bed to achieve high heat and mass transfer rates both within the combustor and with heat exchange equipment.

A fluidized bed is formed when a sufficient flow of fluid passes upwards through a quantity of a solid particulate substance causing the solid/fluid mixture to behave as a fluid. This results in the medium having many properties and characteristics of normal fluids, such as the ability to flow freely under gravity, or to be pumped using fluid type technologies.

The present invention utilizes the rapidly mixing of the fuel with the oxygen while removing heat from the system sufficiently quickly to avoid localized high temperatures, which would result in process failure.

The present invention incorporates an oxygen carrier into a pulverized fuel and pulverized sulphur sorbent based oxy-fluidized bed combustor to reduce or eliminate regions with insufficient oxygen present to complete combustion.

In a preferred embodiment of the invention, an elevated pressurized system is used.

The present invention requires that the oxygen carrier is sufficiently coarse that it remains within the fluidized bed.

Referring to FIG. 1, an embodiment of the system of the present invention is shown.

LIST OF REFERENCE CHARACTERS

1 Fuel hopper
2 Sorbent hopper
3 Fuel and sorbent conveying gas
4 Fuel and sorbent injectors
5 Primary oxygen supply
6 Recycled flue gas from recycled flue gas blower
7 Distributor
8 Fluidized bed containing oxygen carrier and potentially inert bed material
9 In bed heat exchanger—transfer heat to heat transfer medium for example water, steam, supercritical $CO_2$, process fluid, air, glycol mixture
10 In bed oxidant injectors
11 Inert bed material hopper
12 Oxygen carrier hopper
13 Inert bed material and oxygen carrier blender
14 Inert bed material and oxygen carrier injection hopper
15 Freeboard
16 Freeboard convective heat exchanger
17 FBC vessel
18 Bed solids removal
19 Conventional particulate separation device(s), e.g. cyclone, impaction separator, filter, bag filters
20 Fly ash removal and/or pressure let-down
21 Flue gas cooler—direct (e.g. water spray) or in-direct cooling (e.g. heat exchanger)
22 Flue gas condensate removal vessel—combined with 21 or separate
23 Flue gas condensate to processing
24 $CO_2$ processing unit
25 $CO_2$ product pipeline
26 Removed impurities stream (gas, liquid or solid streams depending on the technology)
27 Recycled flue gas to recycled flue gas blower
28 Recycled flue gas blower Referring to FIG. 1, pulverized fuel, typically less than about 100 microns in diameter, is fed to a fuel hopper vessel 1 through one of conventional means including lock hopper systems and solids pumps. Fuel hopper 1 acts as a fuel flow surge dampener which minimizes the variation in fuel flow to the combustor.

Pulverized sulphur sorbent, typically less than about 100 microns in diameter, is fed to sorbent hopper 2 through similar means as the fuel is fed to 1. A motive or moderating gas 3, e.g., carbon dioxide produced by the fluidized bed combustion system, pneumatically conveys fuel and sorbent metered from 1 and 2, to one or more injectors 4 into a fluidized bed 8.

Fluidized bed 8 is composed of fluid bed material containing an oxygen carrying material, i.e. an oxygen carrier, and optionally a portion composed of inert bed material.

In a preferred embodiment, inert bed material from inert bed material hopper 11 and oxygen carrier from oxygen carrier hopper 12 are blended in blender 13 prior to being pressurized in lock hopper 14.

The bed material is fluidized via a gas distribution system 7, which may be in the form of a perforated plate, nozzles, tuyeres or other means using a mixture of substantially pure oxygen supply 5 and recycled flue gas 6 with the recycled flue gas being composed primarily of carbon dioxide, water, and oxygen (less than about 4 vol % $O_2$).

Motive or moderating gas 3, containing fuel and sulphur sorbent conveying gas, that has been injected into fluidized bed 8 is combusted in the presence of fluidizing gas 5 and 6 to form carbon dioxide, water, sulphur oxides, and nitrogen oxides.

The permissible concentration of oxygen in the stream composed of 5 and 6 is limited by the necessity to maintain fuel ash components, or in the absence of fuel ash components the fluid bed material, below the temperature where the ash components or the fluid bed material begin to melt resulting in agglomeration of the bed which will ultimately result in unacceptable operation of the combustor.

According to the present invention, an oxygen carrier can be selected where reaction of the oxygen carrier with oxygen is an exothermic reaction that releases heat, while reaction with reduced species can be endothermic that absorbs heat. Furthermore, the heats of reaction on a per unit mass basis are lower than when compared with free oxygen and fuel resulting in lower localized peak temperatures.

Figure 2:
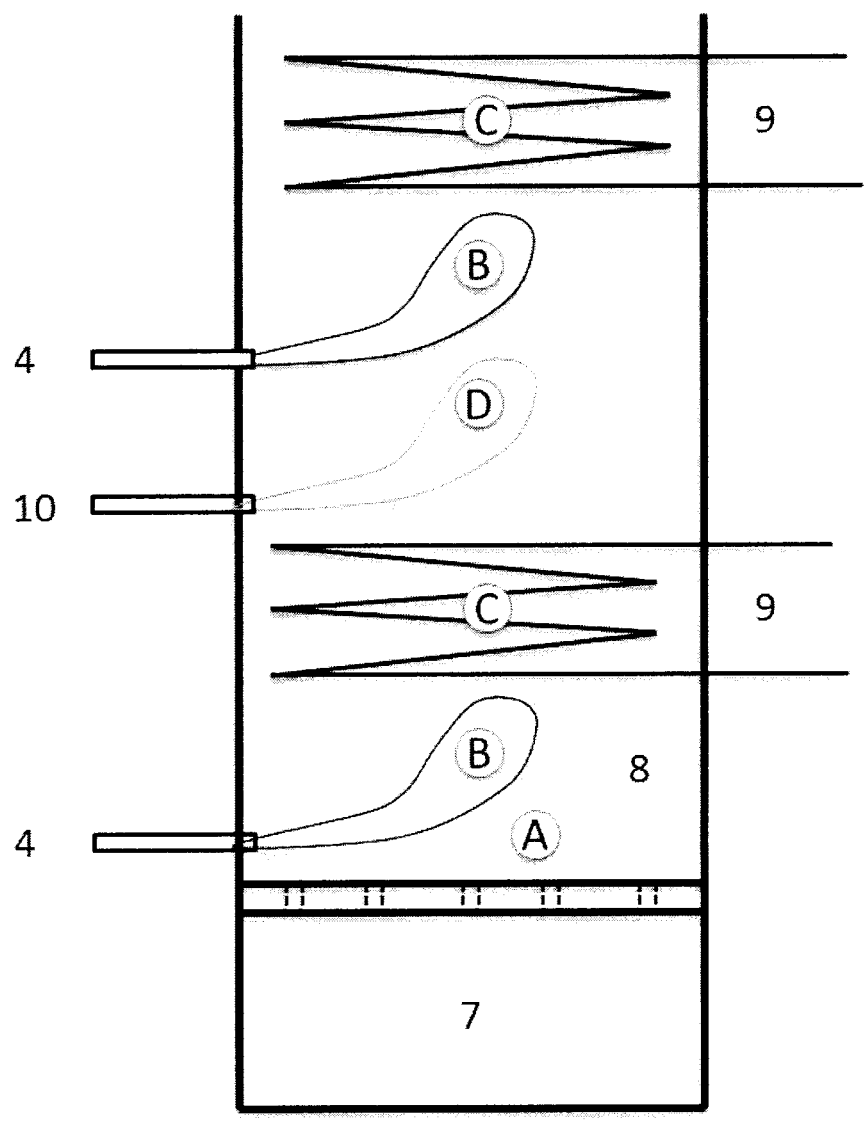
FIG. 2 is a depiction of the in-bed portion of a pressurized fluidized bed combustion system.

Referring to FIG. 2, a portion of the dense fluid bed region 8 and the in-bed boiler 9, the in-bed portion of a pressurized fluidized bed combustion system is depicted.

Following the flow of fluidizing gas from the bottom to the top of the in-bed portion a number of regions are identified as A through D in FIG. 2.

In region A, the oxygen and recycled flue gas is heated through contact with the bed material. When oxygen carrier in a reduced state is present, a portion of the oxygen reacts with it to form a metal oxide with a relatively higher oxidation state. This exothermic reaction aids in rapidly heating the gas to the desired temperature.

In region B, fuel and sulphur sorbent are injected into the bed using a motive gas. Typically, a jet is formed in which the fraction of bed material is lower than in other portions of the bed on per unit volume basis. In this region, fuels, depending on type, pass through a series of stages including drying, pyrolysis, and finally char oxidation. These stages overlap in various locations within region B. In the drying stage, moisture present in the fuel is evolved. In the pyrolysis stage, species including $H_2$, CO, $CO_2$, $H_2O$, $H_2S$, $CH_4$ and higher hydrocarbons will be evolved from the fuel particle or droplet. If these species reach region C before being oxidized then they may remove the protective oxide layer on the heat exchanger tubes within region C resulting in corrosion and subsequently erosion. The oxygen carrier is present on the periphery of, and to some extent within, region B where it oxidizes these species. Due to the endothermic nature of these reactions peak fuel temperatures is reduced, resulting in reduced risk of liquid ash formation and hence bed agglomeration. Bed agglomeration is the combination of solid particulates into larger particles which can grow sufficiently large to defluidize the fluidized bed. This can lead to serious process upsets and damage to the combustion system.

According to the present invention, multiple fuel injectors 4 may be present at a given elevation and fuel injectors may be present at multiple elevations.

In region C, the heat exchanger tubes 9 are immersed in oxidized oxygen carrier which oxidizes reduced species in the region. The oxygen carrier and inert bed material transfer heat to the heat exchange tubes in this region. This region is characterized by excellent gas/solids contacting, however, the contacting of regions with varying gas composition can be poor. The likelihood of a plume of reduced gas passing through this region without being oxidized is reduced when oxygen is available via the solid oxygen earner.

According to the present invention, multiple heat exchange tube banks may be present in the combustor.

In region D, an optional secondary oxygen injector 10 is depicted.

According to the present invention, secondary oxygen injection may be incorporated in order to enhance oxygen distribution throughout the fluidized bed. This may be necessary to avoid excessively high oxygen partial pressures in region A resulting in high local fuel particle or droplet temperatures adjacent to region B. The oxygen carrier may be oxidized in region D releasing heat.

According to the present invention, multiple oxidant injectors may be present at a given elevation and oxidant injectors may be present at multiple elevations.

Referring again to FIG. 1, over time the oxygen carrier attrites and forms finer material that is blown out of the dense fluidized bed 8 through a freeboard region 15, and so an oxygen carrier replenishment system is required which may be combined with an inert bed material replenishment system 11, 13, or 14, combined with fuel and sorbent injection or maintained separately.

The rate of attrition of the oxygen carrier may be greater than inert bed material, so it may be beneficial and sufficient for only a portion of the fluidized bed material to be composed of oxygen carrier while the remainder be inert bed material.

According to an embodiment of the present invention, fluidizing gas superficial velocity is maintained below about 1.2 m/s in order to limit impact force of the oxygen carrier particles on each other and on system components thereby limiting the rate of attrition. This can be achieved in a high throughput unit through pressurization of the combustor requiring the combustor and heat exchange equipment to be located within a vessel 17.

At atmospheric pressure the rates of reaction (reduction and possibly oxidation) of many oxygen carriers that are resistant to poisoning by fuel ash components and are non-toxic are relatively low. The rates of reaction are a function of partial pressure of the reactants, so at elevated pressure reaction rates are increased.

At elevated pressure the size of bubbles in fluidized beds can be reduced resulting in reduced mass transfer resistance and hence improved contacting of oxidizing and reducing gas species with the oxygen carrier.

A benefit of pressurization on the fluidized bed is the depth of penetration of fuel and oxidant jets into the fluidized bed thus increasing the distribution of reactants across the combustor.

The flue gases and fine particulate material flowing upwards from the fluidized bed enter what is referred to as the freeboard region 15. Simply put, the freeboard is the region above the fluid bed, but within the combustor. This region will typically contain a convective heat exchanger 16 for extracting heat from the flue gas and solids prior to a particulate removal device 19 where fuel ash, sulphur sorbent and attrited oxygen carrier 20 are removed from the flue gas.

Following the particulate removal device is a flue gas cooler (e.g. heat exchanger) 21 which may be combined or separate from a condensate removal vessel 22 which separates condensed water and impurities 23 from the flue gas. The flue gas then passes through a $CO_2$ processing unit 24 where further impurities stream and water 26 are separated from $CO_2$ prior to compression and transport of the $CO_2$ via $CO_2$ product pipeline 25. A portion of the $CO_2$ is recycled to the combustor 27 via a recycle gas blower 28 from either the condensate removal vessel 22 or the $CO_2$ processing unit 24.

In reduction or elimination of reducing zones in the combustor, the number of fuel and/or oxidant injectors may be reduced, reducing the cost and complexity of the combustor.

Alternatively, the system may operate with a lower excess of oxygen.

Typically, combustion systems inject more oxygen than is required for complete combustion to reduce the presence of regions where reducing conditions prevail or at least to minimize the emissions of reduced species. In air blown combustors, a minor improvement in performance could occur due to reduced parasitic electric losses related to reduced air blower power requirements. However, in oxy-fired units designed for carbon capture and storage reducing the excess oxygen requirement is more important.

Typically, the oxygen is produced using a cryogenic air separation unit which has both a large power requirement and high capital cost—reducing excess oxygen reduces oxygen production that is unnecessary to complete combustion. Further, the oxygen content of the $CO_2$ product must be in the low ppm range in order to meet pipeline specifications. This can be achieved through catalytic de-oxidation or distillation processes both of which add to process cost and depending on technique may increase greenhouse gas emissions. Operation with reduced excess oxygen can reduce the cost and emissions associated with oxygen removal from the $CO_2$ product.

A risk that is inherent in combustion technologies is the potential for interruptions in oxidant supply or sudden increases in fuel flow to generate brief periods when there is insufficient oxygen available to complete combustion. If this happens, then there may be periods when there is a sufficient fraction of reducing gas species in the flue gas to generate an explosive atmosphere in downstream equipment which if it detonates could result in catastrophic damage to the system.

It should be recognized that the presence of oxidized oxygen carrier in the fluidized bed provides a buffer of oxygen supply within the fluid bed which can reduce the risk associated with interruptions in gaseous oxygen supply or sudden increases in fuel flow. The extent of this buffer is dependent on the oxygen carrying capacity and total quantity of the oxygen carrier.

Experimental

Two types of pulverized coal were used, namely Highvale coal and Poplar River coal. Highvale coal is a sub-bituminous coal from Alberta, Canada that is fired in the Keephills and Sundance generating stations, while Poplar River coal is a lignite coal from Saskatchewan, Canada that is currently fired in the Poplar River generating station.

The fuel proximate analyses (ASTM D7582, ISO 562), ultimate analyses (ASTM D5373, ASTM D4239), fusibility properties (ASTM D1857), and calorific values (ISO 1928) are provided in Table 3 and the major and minor oxide analyses (ASTM D4326) are provided in Table 4.

TABLE 3

Proximate, Ultimate, Fusibility Properties and Heating Value of Pulverized Fuels As Analyzed

|  |  | Highvale Coal | Poplar River Coal |
|---|---|---|---|
| Proximate |  |  |  |
| Moisture TGA | wt % | 4.25 | 4.20 |
| Ash | wt % | 23.14 | 16.64 |
| Volatile | wt % | 29.32 | 38.20 |
| Fixed Carbon | wt % | 43.29 | 40.96 |
| Ultimate |  |  |  |
| Carbon | wt % | 53.0 | 54.9 |
| Hydrogen | wt % | 3.27 | 3.42 |
| Nitrogen | wt % | 0.76 | 0.77 |
| Total Sulfur | wt % | 0.32 | 1.03 |
| Oxygen by Difference | wt % | 15.26 | 19.01 |
| Gross calorific value, HHV | MJ/kg | 20.39 | 21.34 |
| Fusibility, Oxidizing |  |  |  |
| Initial | ° C. | 1321 | 1235 |
| Spherical | ° C. | 1341 | 1249 |
| Hemispherical | ° C. | 1343 | 1254 |
| Fluid | ° C. | 1368 | 1302 |
| Fusibility, Reducing |  |  |  |
| Initial | ° C. | 1252 | 1171 |
| Spherical | ° C. | 1349 | 1199 |
| Hemispherical | ° C. | 1357 | 1252 |
| Fluid | ° C. | 1413 | 1313 |

The oxygen carrier used is UKTO ilmenite ore, a beneficiated massive rock produced from raw ilmenite ore after removing most of its gangue material by gravity separation. The upgraded rock ilmenite was roasted under oxidizing atmosphere at 900-1000° C. to improve its magnetic behaviour and to remove all sulphides and sulphosalts.

The ilmenite ore was supplied by Rio Tinto Iron & Titanium, Québec, Canada.

The material was crushed and sieved to a particle size of 425-869 μm. The chemical composition of the ore measured by X-ray fluorescence (XRF) analysis (ASTM D4326) can be found in Table 4.

A sand (99.8 wt-% in $SiO_2$), which was used as a reference bed material, was sieved to a particle size of 600-1040 μm. For $SO_2$ capture, a pulverized local limestone (KK Karson) was used.

The composition of the limestone was measured by XRF is provided in Table 4.

TABLE 4

Major and Minor Oxides Analyses of Test Fuels, Limestone and Ilmenite

|  |  | Poplar River Coal | Highvale Coal | UKTO Ilmenite | KK Karson Limestone |
|---|---|---|---|---|---|
| $SiO_2$ | wt % | 33.40 | 51.98 | <0.10 | 6.56 |
| $Al_2O_3$ | wt % | 20.41 | 25.39 | 0.36 | 1.44 |
| $Fe_2O_3$ | wt % | 6.87 | 2.77 | 60.90 | 0.58 |
| $TiO_2$ | wt % | 0.71 | 0.80 | 36.50 | 0.03 |

TABLE 4-continued

Major and Minor Oxides Analyses of Test Fuels, Limestone and Ilmenite

|  |  | Poplar River Coal | Highvale Coal | UKTO Ilmenite | KK Karson Limestone |
|---|---|---|---|---|---|
| $P_2O_5$ | wt % | 0.06 | 0.04 | <0.03 | 0.16 |
| CaO | wt % | 18.95 | 11.26 | <0.05 | 49.29 |
| MgO | wt % | 5.48 | 0.64 | 1.72 | 1.12 |
| $SO_3$ | wt % | 11.98 | 3.5 | <0.10 | 0.26 |
| $Na_2O$ | wt % | <0.20 | 1.78 | <0.20 | <0.20 |
| $K_2O$ | wt % | 0.39 | 0.44 | <0.20 | 0.38 |
| Barium | wppm | 1403 | 4050 | 1927 | <250 |
| Strontium | wppm | 1144 | 1020 | <50 | 698 |
| Vanadium | wppm | 234 | 72 | 1350 | <50 |
| Nickel | wppm | 1259 | <50 | 302 | <50 |
| Manganese | wppm | 554 | 283 | 985 | 239 |
| Chromium | wppm | 158 | <50 | 752 | <50 |
| Copper | wppm | 38 | 97 | 164 | <30 |
| Zinc | wppm | 61 | 78 | 71 | <30 |
| Loss on Fusion | wt % | 1.18 | 0.82 | 0.0 | 40.07 |
| Total | wt % | 100 | 100 | 100 | 100 |

The phases present in the ilmenite ore were measured by X-ray diffraction (XRD) and the compounds are provided in Table 5.

TABLE 5

Quantified X-ray diffraction analysis of UKTO ilmenite

| Phase ID | Chemical Formula | % |
|---|---|---|
| Pseudobrookite, syn | $TiFe_2O_5$ | 40.7 |
| Hematite, syn | $Fe_2O_3$ | 26.9 |
| Rutile, syn | $TiO_2$ | 3.1 |
| Crystallinity |  | 70.7 |
| Amorphous |  | 29.3 |

The test facility used in this work was the 50 $kW_{th}$ CanmetENERGY oxy-FBC facility operated at atmospheric pressure using under bed fines feeding of fuel and sorbent. A schematic diagram of the system is shown in FIG. 3.

LIST OF REFERENCE CHARACTERS

Figure 3:
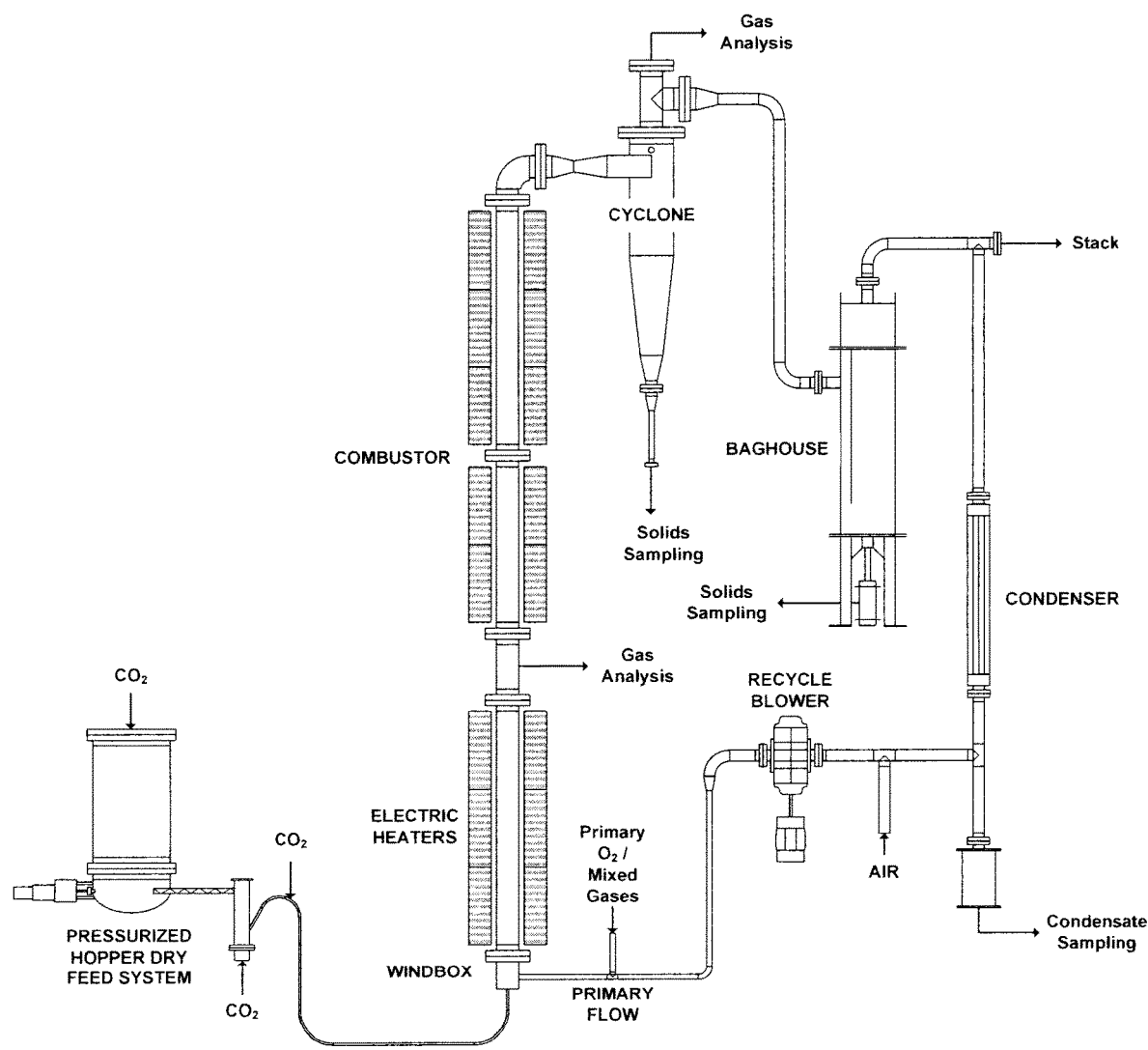
FIG. 3 is a schematic representation of an embodiment of an Oxy-FBC system.

30 Combustor
31 Electric Heaters
32 Pressurized Feed Hopper
33 Cyclone
34 Baghouse
35 Condenser
36 Windbox
37 Recycle Blower Referring to FIG. 3, the system consists of a stainless-steel combustor 30 with an internal diameter of 0.1 m and a height of 5.0 m. Combustor 30 is outfitted with electric heaters 31 capable of reaching temperatures up to 1050° C. Heaters 31 were used during the pre-heating stage and also for temperature control along the entire length of combustor 30. Combustor 30 was fed with coal (mixed with limestone) via a pressurized feed hopper 32 and conveying line through the bottom of the bed. Combustor 30 is outfitted with multiple gas and solid sampling ports. Gas samples were extracted from combustor 30 (top of the bed) and the cyclone 33 (exit of the cyclone). Bed solid samples were extracted from a port at a height of 0.5 m above the distributor, while fly ash was extracted from the cyclone 33 and the baghouse 34.

To evaluate the impacts of oxygen carrier assisted combustion using ilmenite in oxy-FBC when compared to oxy-FBC with a sand bed, fluidizing regime may be an important interference in establishing the difference in performance between ilmenite and sand beds. Considering the difference in density between ilmenite and quartz sand, it was not possible to exactly match fluidization behaviour. Therefore, equal minimum fluidizing velocities ($U_{mf}$) for both materials are specified by controlling particle size and maintaining a constant $U/U_{mf}$ to provide similar fluidization behaviour.

For each test, the combustor was loaded with a specified quantity of bed material to help distribute heat while preheating the system overnight at 650° C. Depending on the bed material (sand, ilmenite, or mixture of both in 50/50) the expanded bed height was maintained roughly constant. Accordingly, the initial bed inventory loaded to the combustor varied due to varying material densities and ranged from ~11.5 kg for sand to ~13 kg for ilmenite. After reaching the desired temperature, coal feeding (mixed with limestone in cases with $SO_2$ capture) under air-fired conditions was initiated and the combustor was subsequently switched over to oxy-combustion conditions.

Initial tests were performed to establish the differences in performance of ilmenite and quartz sand beds at various temperatures and with various $O_2$ flue gas concentrations both with and without additional pulverized limestone injected with the fuel. Fuel was thoroughly mixed with the limestone using a V-drum mixer prior to being loaded into the pressurized fuel and sorbent hopper. After initial tests were complete, blends of quartz sand and ilmenite were investigated to evaluate the potential for reduced ilmenite replenishment requirement.

A series of tests were first performed with Highvale coal without addition of limestone. The effect of oxygen concentration in the flue gas on the performance was investigated by maintaining the $O_2$ concentration in the flue gas at three levels, approximately 2, 5 and 8 vol % on a dry basis (db), with the $O_2$ concentration controlled by the rate of oxygen injection into the combustor. Meanwhile, the combustion temperature in the bed region was maintained at 850° C.

A similar series of tests were then conducted for Poplar River coal with limestone addition to investigate sulphur capture and the effect of combustion temperature on performance using ilmenite as bed material. The bed combustion temperature was maintained at three levels (800, 850 and 900° C.) by varying fuel feeding rate and external electric heaters output.

When burning Poplar River coal, $O_2$ in the flue gas was maintained at around 5%, except for the temperature of 850° C. when two $O_2$ levels, 2 and 5 vol-% db, were compared. The full test matrix is provided in Table 6, and the operating parameters of the combustor are summarized in Table 7.

TABLE 6

Test Matrix

| Test ID | Solid Fuel | Bed Material | Limestone Co-injection | Temperature ° C. | $O_2$ in Flue Gas, db, vol % |
|---|---|---|---|---|---|
| 1 | Highvale | Quartz | N | 850 | 1-3, 4-6, 7-9 |
| 2 | Highvale | Ilmenite | N | 850 | 1-3, 4-6, 7-9 |
| 3 | Highvale | Mix (50:50) | N | 850 | 1-3, 4-6, 7-9 |
| 4 | Poplar River | Mix (50:50) | Y | 800, 850, 900 | 1-3, 4-6 |
| 5 | Poplar River | Ilmenite | Y | 800, 850, 900 | 1-3, 4-6 |
| 6 | Poplar River | Quartz | Y | 800, 850, 900 | 1-3, 4-6 |
| 7 | Poplar River | Fresh Mix (50:50) | Y | 800, 850, 900 | 1-3, 4-6 |

TABLE 7

Operating Parameters

|  | Ilmenite | Sand | Mix (50:50) |
|---|---|---|---|
| Size range, μm | 643 (425-869) | 709 (600-1040) | 676 (425-1040) |
| Density, kg/m$^3$ | 4330.6 | 2445.4 | 3388 |
| Umf, m/s | 0.37 | 0.36 | 0.36 |
| U/Umf, - | 6.76 | 6.67 | 6.67 |
| Temperature, ° C. | | 800, 850, 900 | |
| Comb mode | | Oxy-fire | |
| $O_2$ in the flue gas, % | | 2, 5, 8 | |
| Pulv. coal size, mm | | ~70 | |
| Fuel feed rate, kg/h | | 4.6-6.1 | |
| Recycled flue gas, slpm | | 180-230 | |
| Pure $O_2$, slpm | | 82-92 | |
| $O_2$ in the windbox, % | | 22.8-25.6 | |
| Sorbent | | KK Limestone | |
| Ca/S | | 2.0 (Poplar River) | |

On-line gas analyzers continually monitored $O_2$ (Siemens Oxymat 61), CO, (Horiba VIA-510), CO (Horiba VIA-510), $SO_2$ (Amatek 921), and NO, (Thermo 32C) concentrations from the combustor exhaust. $O_2$ (Siemens Oxymat 61), $CO_2$ (Horiba VIA-510), CO (Horiba VIA-510), HCs and other concentrations (Gasmet DX4000 FTIR) are also monitored at the top of the fluidized bed.

Figure 4:
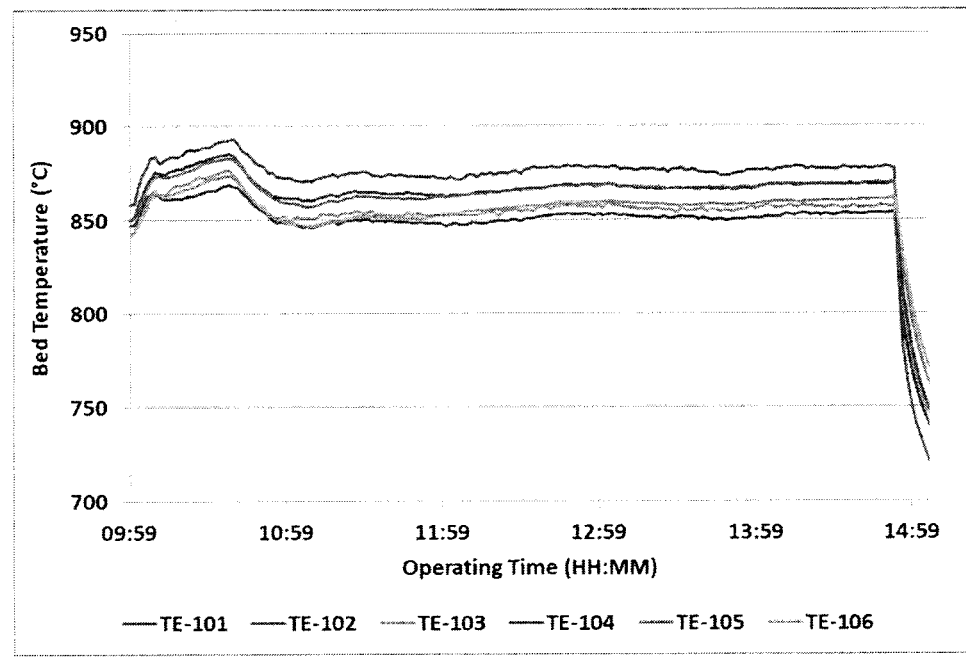
FIG. 4 is a temperature profile when burning Highvale coal with a sand bed in the bed region.
Figure 5:
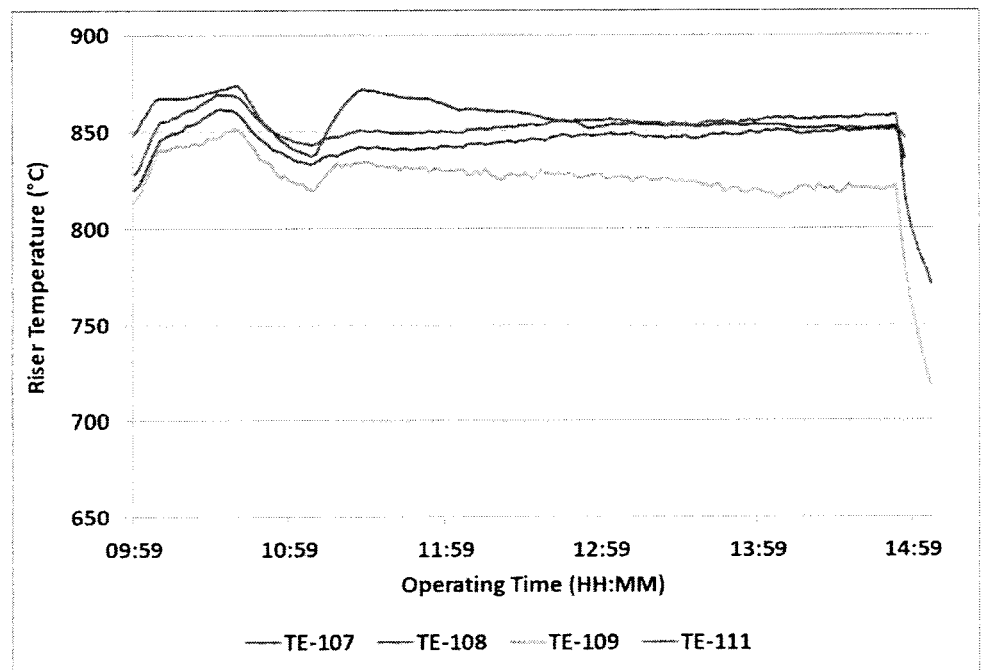
FIG. 5 is a temperature profile when burning Highvale coal with a sand bed in the riser region.

FIGS. 4 and 5 presents temperature profiles along the axial length of the bed (FIG. 4) and riser (FIG. 5) during a Highvale coal combustion test.

Figure 6:
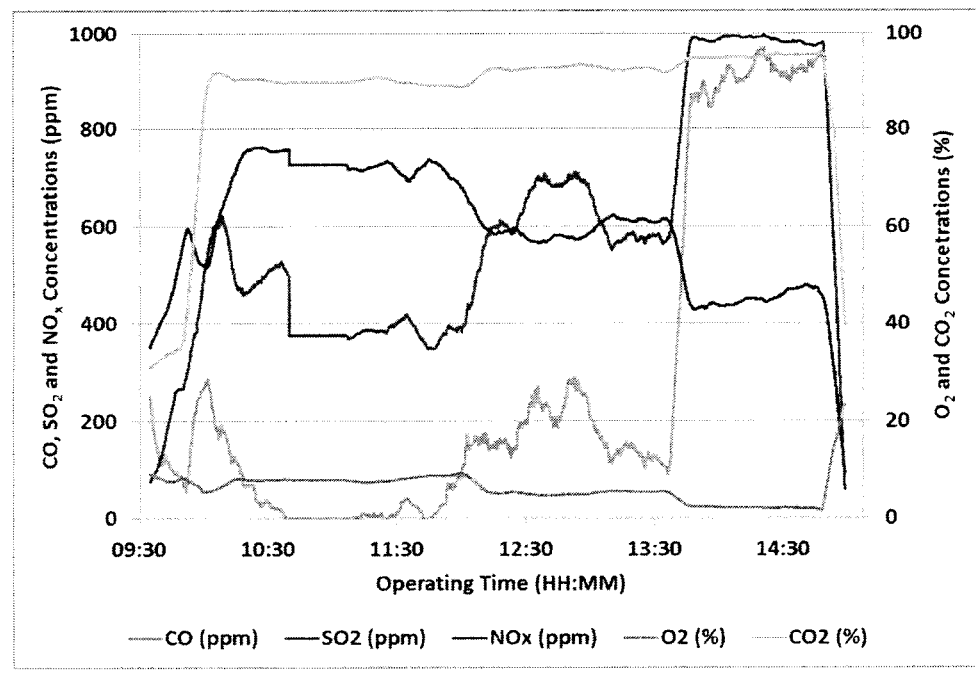
FIG. 6 show the concentration profiles of $O_2$, $CO_2$, CO, $SO_2$, and $NO_x$ when burning Highvale coal with a sand bed at various flue gas oxygen concentrations.

FIG. 6 presents the emission profiles ($O_2$, $CO_2$, CO, $NO_x$, and $SO_2$) during the same period. Start-up occurred during the first 1.5 h of the test between 9:30-11:00, while flue gas recirculation in the combustor was started 0.5 h into the test. The $CO_2$ concentration reached the desired level in the combustor ($CO_2$>90 vol %) approximately 15-20 minutes after the start of flue gas recirculation. After the bed reached the specified operating temperature (850° C. average in the dense bed region within 1.2 m of the distributor) all set points were fixed to establish stable operation.

Stable operation typically continued for more than one hour, in which only minor adjustments were made to maintain test specifications. Solid samples, including bed material and cyclone fly ash, were taken prior to changes in operating conditions. $O_2$ in the flue gas was set at approximate 8 vol % for the first condition lasting 1.4 h (10:20-11:40 am), then dropped to 5 vol % for the second condition lasting 1.2 h (12:20-13:30 μm), and finally further reduced to 2 vol % for the last condition (13:45-14:50) (FIG. 6). $O_2$ concentration in the flue gas was reduced by decreasing $O_2$ flow rate while simultaneously increasing the recirculating flue gas flow rate to maintain the given superficial fluidizing velocity.

When testing with Poplar River coal (FIGS. 7 and 8) the bed temperature was varied to study its effect on combustion performance and sulphur capture. Fresh limestone was premixed with pulverized coal at a molar ratio of Ca/S=2.0.

During the test, the fuel injection rate was increased to increase the temperature while at the same time the oxygen injection rate was increased to maintain the $O_2$ concentration in the flue gas constant.

Figure 7:
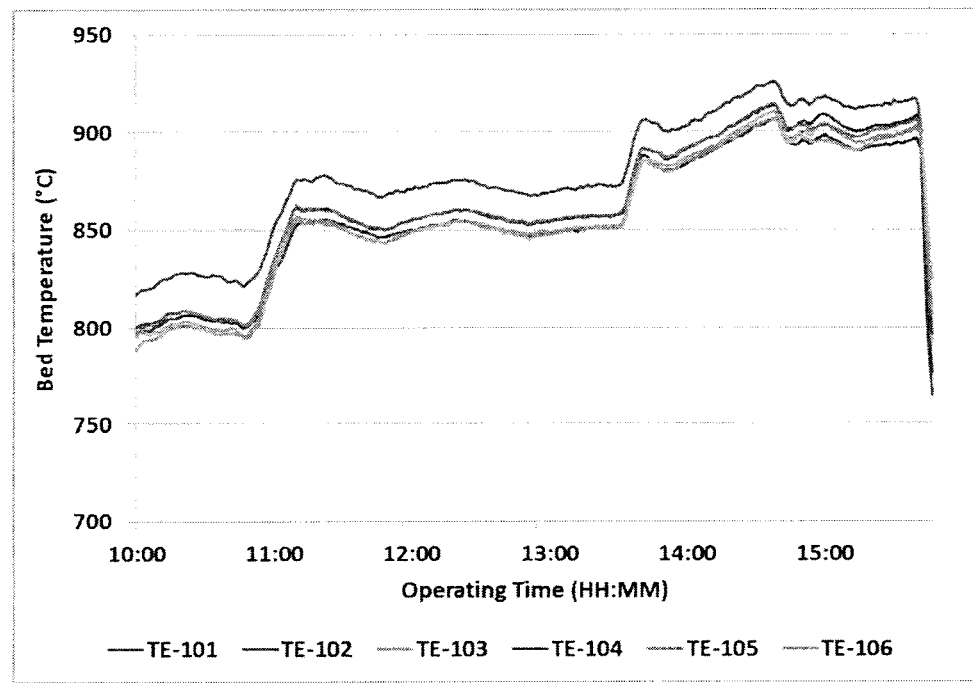
FIG. 7 show the profiles resulting from burning poplar river coal in an ilmenite bed at various temperatures in the bed region.
Figure 8:
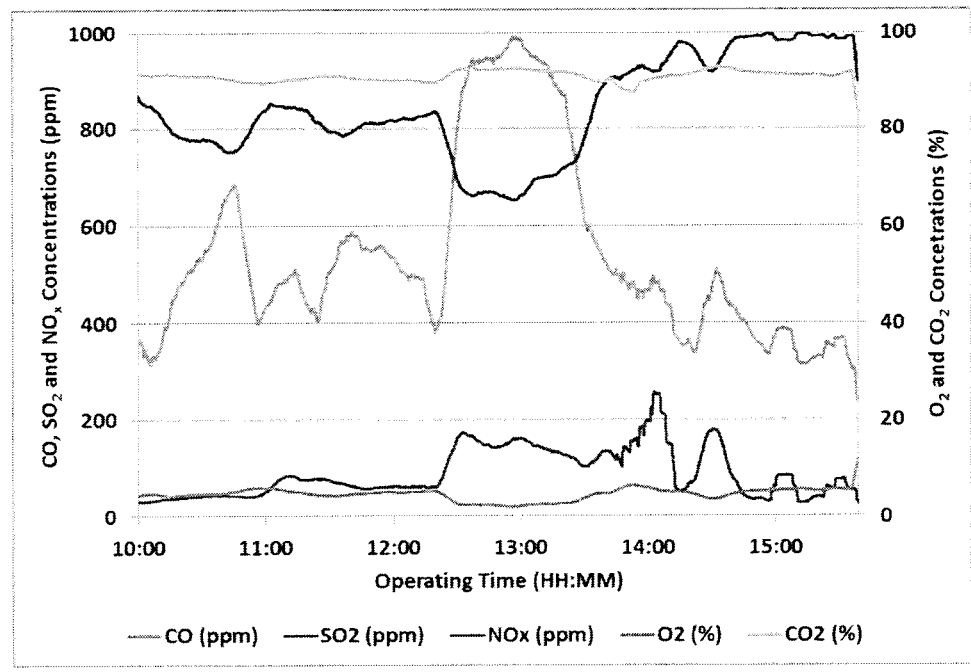
FIG. 8 show the profiles resulting from burning poplar river coal in an ilmenite bed at various concentrations of $O_2$, $CO_2$, CO, $SO_2$, and $NO_x$.

FIG. 7 presents the temperature profiles of the test performed with Poplar River coal with an ilmenite bed. The first operating condition, $T_{bed}=800°$ C. and $O_2=5\%$, was reached approximately one hour after the introduction of the coal and the condition was maintained for ~1 h (between 10:00-11:00 am). The bed temperature was raised to 850° C. for the second condition. The $O_2$ level was tested at two concentrations, with each condition held constant for more than an hour (between 11:20 am-13:40 μm). Finally, the bed temperature was increased to 900° C. and the $O_2$ level returned to the reference level (~5%) for the third operating condition (between 14:00-15:40 μm). The corresponding concentration profiles of $O_2$ and impurities in the flue gas are provided in FIG. 8.

Concentrations of unburnt hydrocarbons were measured at the top of the bed and CO was measured at both the splash zone above the bed and at the vortex finder of the cyclone for all operating conditions. Table 8 shows the corresponding measured concentrations of the flue gas species corrected to 5 vol % $O_2$ for burning both coals.

TABLE 8

Performance Summary of Test Results with Highvale Coal

|  | Sand | Ilmenite | Mix (50/50) |
|---|---|---|---|
| T_bed, ° C. | 863 | 861 | 859 |
| T_riser, ° C. | 846 | 837 | 854 |
| Flue gas (CFB analyzer) | | | |
| $O_2$, % | 5.13 | 5.10 | 4.81 |
| $CO_2$, % | 92.8 | 93.4 | 92.9 |
| CO, ppm | 188 | 128 | 143 |
| $SO_2$, ppm | 673 | 378 | 526 |
| $NO_x$, ppm | 598 | 895 | 990 |
| Above the bed (FTIR) | | | |
| $H_2O$, % | 11.0 | 10.4 | 11.0 |
| CO, ppm | 2223 | 1260 | 1827 |
| $CH_4$, ppm | 36.6 | 15.9 | 35.6 |
| $C_2H_4$, ppm | 13 | 7.3 | 14.5 |
| $SO_2$, ppm | 731 | 497 | 682 |
| $N_2O$, ppm | 112 | 124 | 109 |

Tables 8 and 9 also show the performance of mixed bed materials with 50:50 weight ratios between ilmenite ore and quartz sand.

The emissions, including HCs, CO, and $SO_2$, are generally lower for the mixed bed than quartz bed, but higher than full ilmenite ore bed. The performance of the 50:50 mixed beds was more towards the results from the full oxygen carrier bed, rather than full quartz bed.

TABLE 9

Performance Summary of Test Results with Poplar River Coal

|  | Sand | Ilmenite | Fresh Mix (50/50) | Spent Mix (50/50) |
|---|---|---|---|---|
| T_bed, ° C. | 852 | 854 | 855 | 855 |
| T_riser, ° C. | 848 | 844 | 851 | 849 |
| Flue gas (CFB analyzer) | | | | |
| $O_2$, % | 4.43 | 4.74 | 4.56 | 5.30 |
| $CO_2$, % | 93.7 | 90.9 | 92.5 | 92.4 |
| CO, ppm | 595 | 535 | 534 | 595 |

TABLE 9-continued

Performance Summary of Test Results with Poplar River Coal

|  | Sand | Ilmenite | Fresh Mix (50/50) | Spent Mix (50/50) |
|---|---|---|---|---|
| $SO_2$, ppm | 165 | 61.0 | 102 | 114 |
| $NO_x$, ppm | 553 | 794 | 635 | 1021 |
| Above the bed (FTIR) | | | | |
| $H_2O$, % | 11.3 | 12.6 | 10.7 | 13.4 |
| CO, ppm | 1733 | 1485 | 1273 | 1874 |
| $CH_4$, ppm | 32.9 | 13.5 | 7.8 | 42.9 |
| $C_2H_4$, ppm | 8.9 | 0.2 | 2.8 | 16.2 |
| $SO_2$, ppm | 418 | 304 | 276 | 376 |
| $N_2O$, ppm | 106 | 153 | 143 | 120 |

The flue gas within the splash zone contained significantly higher concentrations of unburnt hydrocarbons than were detected in the vortex finder.

In comparison to the quartz sand bed, the ilmenite ore bed demonstrated better combustion with lower hydrocarbon concentrations in the splash zone; an ~40% reduction of both $CH_4$ and $C_2H_4$ when burning Highvale coal (Table 8).

For Poplar River coal the reduction of unburnt hydrocarbons was even greater; a 65% reduction of $CH_4$ and complete elimination of $C_2H_4$ (Table 9).

As shown in Tables 8 and 9, CO concentrations in the bed region have similar trends to the hydrocarbons, in that the OC bed material reduces CO concentrations in the bed when comparing quartz sand with ilmenite ore.

The CO concentration was reduced by 44% when using OC bed material when burning Highvale coal, but it was only reduced by 15% when burning Poplar River coal.

Figure 9:
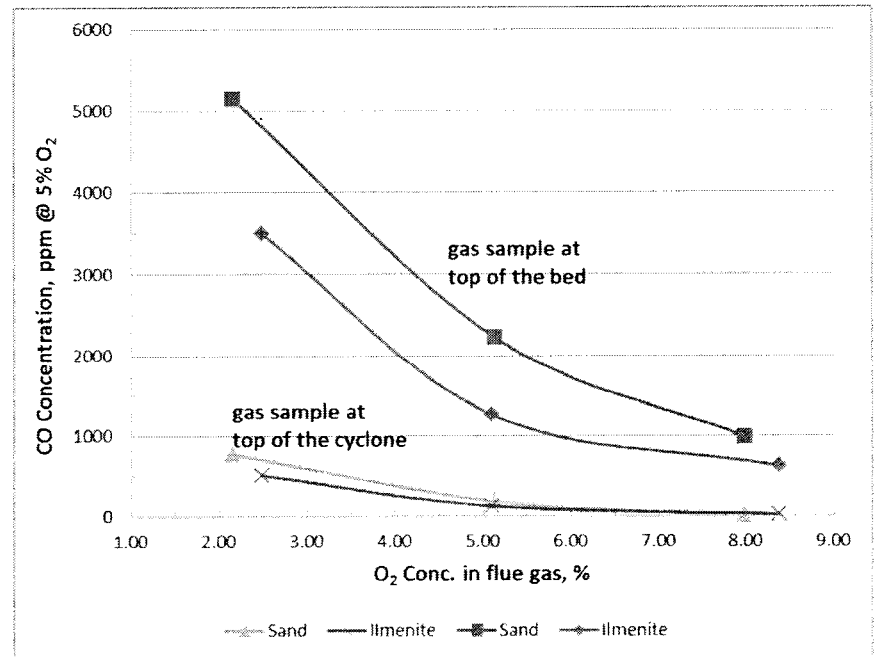
FIG. 9 is a graph showing CO emissions from combusting Highvale coal.

FIG. 9 compares the CO concentration at the cyclone vortex finder and in the splash zone of the bed as a function of oxygen concentration at a bed temperature of 850° C.

CO emissions were significantly reduced with increasing $O_2$ in the flue gas. The improvement in combustion performance when using ilmenite ore as bed material was more pronounced at lower $O_2$ concentration.

At 2.5 vol % $O_2$ in the flue gas a 50% reduction of CO concentration occurred when bed material was switched from quartz sand to ilmenite ore. The reduction in CO concentration was 40% at 5 vol % $O_2$, and finally almost no reduction CO concentration occurred when $O_2$ in the flue gas was 8 vol %, attributable to the effectiveness of the OC material versus the level of $O_2$ concentration in the bed, i.e., increasing the availability of $O_2$ in the bed results in the decrease of OC's effect until the $O_2$ is sufficiently high.

Figure 10:
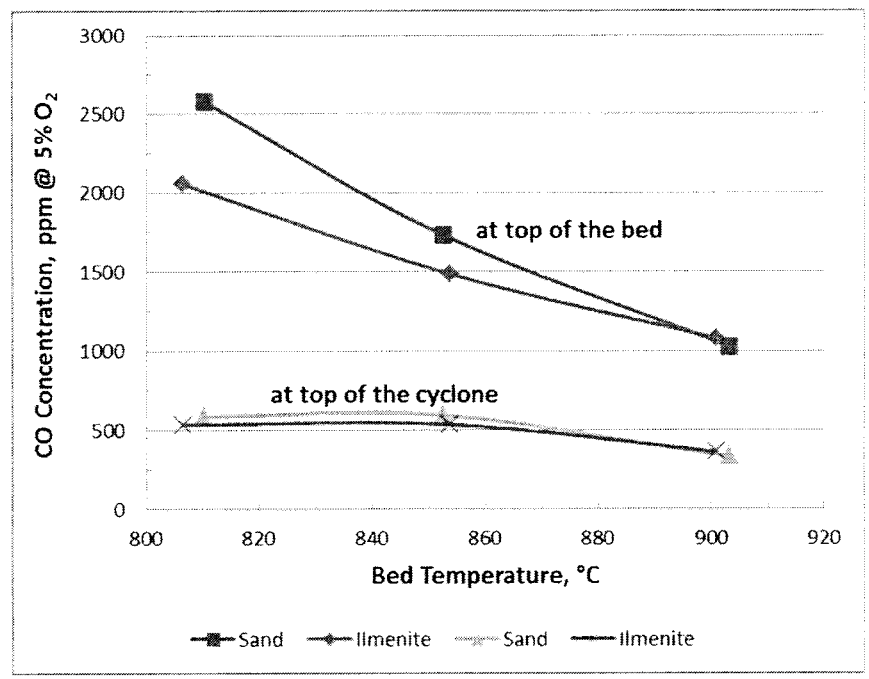
FIG. 10 is a graph showing CO emissions from combusting Poplar River coal.

FIG. 10 compares the CO emissions at the cyclone vortex finder and in the splash zone of the bed as a function of bed temperature at 5 vol % $O_2$ when burning Poplar River coal. The CO concentration decreased with increasing temperature and there was significant enhancement of CO reduction when using ilmenite bed material at a low temperature (~800° C.). This enhancement was less pronounced as temperature increased.

Figure 11:
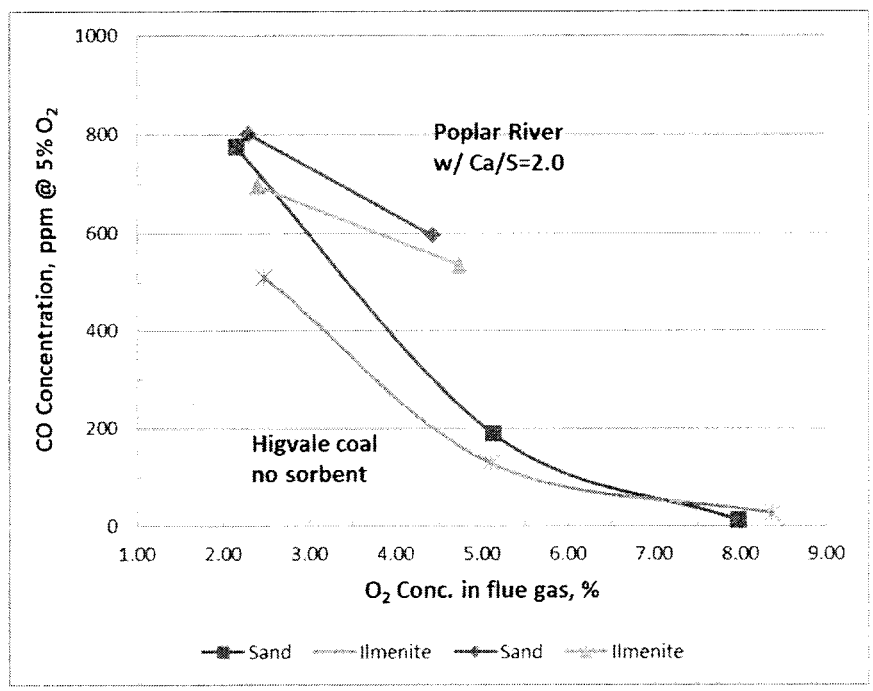
FIG. 11 is a graph showing CO emissions as function of $O_2$ concentration in flue gas.

The CO concentration versus $O_2$ concentration in the flue gas is compared for both coals in FIG. 11. The CO emissions are much higher at low $O_2$ concentration and decreased greatly with increasing $O_2$ in the flue gas, in particular when burning Highvale coal. Ilmenite bed material showed a remarkable effect on improving the coal combustion; especially at low $O_2$ concentrations. The benefit of ilmenite bed material is reduced with increasing combustion temperature and vanishes completely when $O_2$ concentration in the flue gas increased to 8%.

FIG. 11 shows that the CO concentration in the flue gas, for both coals, was at the same level, ~800 ppm with 2.0-2.5 vol % $O_2$, using sand bed material. Ilmenite bed material testing showed more improvement in reducing CO concentration for Highvale coal (~38% reduction) compared to Poplar River coal (only ~13% reduction).

Figure 12:
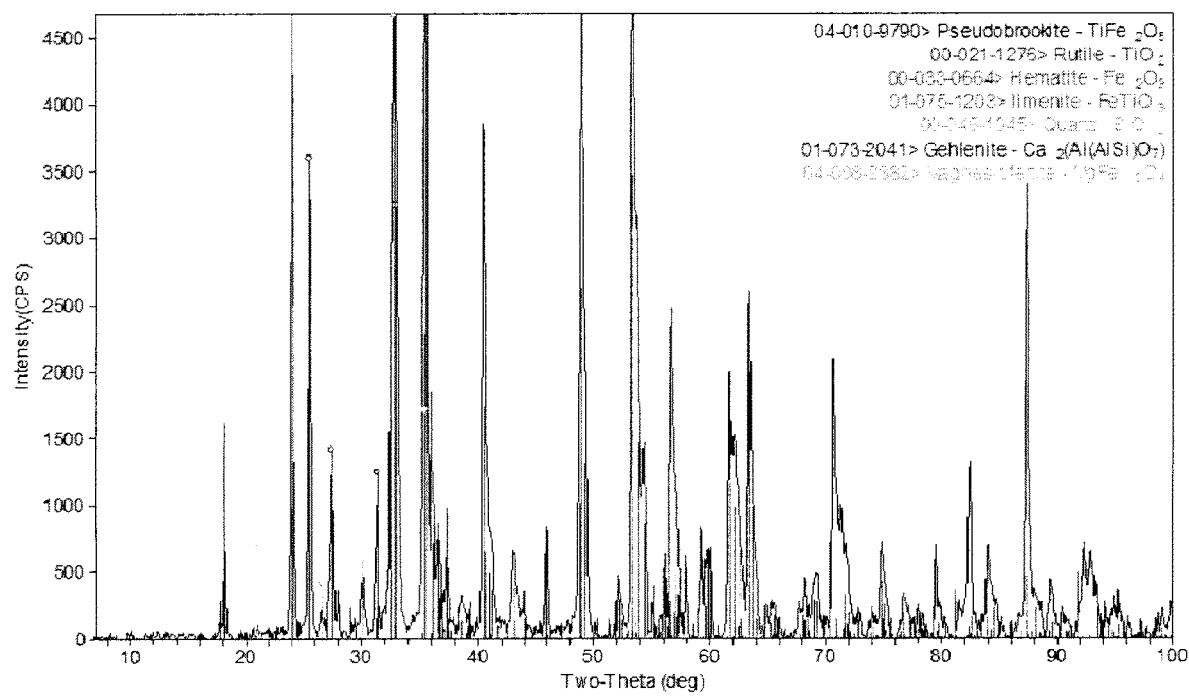
FIG. 12 shows the XRD spectra for an in-situ bed material solid sample from combustion of Poplar River coal with ilmenite ore bed material and with limestone for sulphur capture.

FIG. 12 shows the XRD spectra for an in-situ bed material solid sample from combustion of Poplar River coal with ilmenite ore bed material and with limestone for sulphur capture. The spectra correspond to Test #4 in Table 10 below, where the chemical compounds in the crystalline phase.

Table 10 shows that iron is mainly incorporated in the following compounds: pseudobrookite ($TiFe_2O_5$), ilmenite ($FeTiO_3$) and hematite ($Fe_2O_3$). Titanium is primarily associated with pseudobrookite, ilmenite and rutile ($TiO_2$).

A small amount of magnesioferrite ($MgFe_2O_4$) is found in all of the samples, but gehlenite ($Ca_2(Al(AlSi)O_7)$) is only present when burning Poplar River coal, as limestone was fed together with the coal for capturing sulphur. Since the bed solid sample was taken in-situ and rapidly cooled, the compounds analysed ought to represent the in-situ composition of bed materials.

C. (Test #3) to 901° C. (Test #4). These results correlate with the concentration trends of the unburnt HCs and CO, i.e., the ilmenite bed material played a more significant role in enhancing coal combustion when the bed was operated at either low $O_2$ concentration or at low combustion temperature.

There was no indication of bed agglomeration during the tests. As well, no hot spots in the combustor and no defluidization were observed. The bed materials were discharged smoothly via the discharge port at the bottom of the bed. It should be noted that Highvale coal has a substantial Na content, but no chemical compounds related to Na were present in the bed solid samples which could have contributed to agglomeration if they were on the surface of the bed ash. SEM images confirmed no agglomeration at for the bed material from the in-situ operation or after runs.

Table 11 summarizes the results of analyses for the flue gas condensates collected in the flue gas cooler located at the flue gas recycle system. All condensate samples were acidic and the pH values were in the range of 2.32 to 2.62. The acidity was mainly attributed to dissolved sulphates and chlorides. Sulphate ($SO_4$) was the dominate solute with concentration in the range 180 mg/l to 270 mg/l. The

TABLE 10

XRD Analysis for Different Bed Samples

| Sample ID | | Test #1 | Test #2 | Test #3 | Test #4 |
|---|---|---|---|---|---|
| Coal | | Highvale | Highvale | Poplar River | Poplar River |
| Bed temperature | ° C. | 858 | 862 | 807 | 901 |
| $O_2$ in flue gas | % | 2.5 | 5.0 | 4.7 | 5.3 |
| Chemical compound | | % Chemical compound | | | |
| Pseudobrookite, syn | $TiFe_2O_5$ | 1.1 | 16.8 | 3.7 | 16.0 |
| Rutile, syn | $TiO_2$ | 1.5 | 0.8 | 1.2 | 1.0 |
| Hematite, syn | $Fe_2O_3$ | 3.0 | 8.4 | 2.2 | 5.6 |
| Ilmenite, syn | $FeTiO_3$ | 23.8 | 7.1 | 19.1 | 7.0 |
| Gehlenite, syn | $Ca_2(Al(AlSi)O_7)$ | | | 1.1 | 2.2 |
| Magnesioferrite, syn | $MgFe_2O_4$ | 3.6 | 2.8 | 2.1 | 1.7 |
| Crystallinity (%) | | 32.9 | 36.0 | 29.5 | 33.5 |
| Amorphous (%) | | 67.1 | 64.0 | 70.5 | 66.5 |

As shown in Table 10, much higher contents of $TiFe_2O_5$ and $Fe_2O_3$, which result from oxidation of $FeTiO_3$ and FeO, respectively, when the $O_2$ in the flue gas changed from low concentration (2.5% in Test #1) to high (5.0% in Test #2) and when the combustion temperature was increased from 809° dissolved chlorides (as Cl) were significant and in the range of 10 to 51 mg/l. Cl was present at lower concentration in the condensates from ilmenite tests than in either the quartz sand bed or mixed bed tests. The lower Cl concentration corresponds with the lower acidity of these condensates.

TABLE 11

Liquid analysis for different condensates

| | | Sample ID | | | | | |
|---|---|---|---|---|---|---|---|
| | | Test #1 | Test #2 | Test #3 | Test #4 | Test #5 | Test #6 |
| | | Coal | | | | | |
| | | Highvale | Highvale | Highvale | Poplar River | Poplar River | Poplar River |
| | | Bed material | | | | | |
| Parameter | Method | Sand | Ilmenite | Mix (50:50) | Mix (50:50) | Sand | Ilmenite |
| | | mg/L | | | | | |
| Sulphate | in-house | 270 | 240 | 250 | 190 | 180 | 220 |
| Chloride | in-house | 38.5 | 18.0 | 50.7 | 22.9 | 20.9 | 9.6 |
| Fluoride | in-house | 0.31 | 0.23 | 0.35 | 0.17 | 0.11 | 0.15 |
| Bromine | in-house | 0.18 | 0.24 | 0.48 | 0.20 | 0.13 | 0.15 |
| pH | — | 2.32 | 2.62 | 2.36 | 2.44 | 2.44 | 2.52 |

Another notable improvement evident when using ilmenite bed material was the combustion temperature profile in the dense bed.

Presented herein is the profile from the bottom to the top of the bed (0.13-0.89 m above the distributor) with six thermocouples (T101-T106 in FIGS. 4 and 7) with a spacing of 0.13 m between them.

The combustor was operated in the turbulent fluidization regime, the bed temperature would be reasonably uniform if fed coarse fuel. However, with the pulverized fuel burned in these tests a temperature gradient was apparent.

Using ilmenite ore as bed material, the temperature profile showed less variation (FIG. 7) in comparison to the quartz sand bed (FIG. 4). Under reference conditions (850° C., 5 vol % $O_2$), the temperature variation in the bed was +/−20° C. when using quartz sand and only +/−12° C. for ilmenite ore, the result of reaction of the ilmenite or a consequence of the differing heat capacity of the materials.

The experimental described hereinabove investigated the effect of ilmenite bed material on the combustion performance, CO concentration in the flue gas in a pilot-scale oxy-FBC using two Canadian coals with under bed fuel and sorbent injection.

The results have shown improved sulphur capture as indicated by lower $SO_2$ concentration in the flue gas. The $NO_x$ concentration has increased which is evidence that the ilmenite (as oxygen carrier) has reduced or eliminated the presence of reduced zones within the fluid bed. Less unburned hydrocarbons and carbon monoxide in the flue gas is observed, which provides further evidence of the oxygen-enhanced combustion when an oxygen carrier was used as the bed material when compared to a conventional sand bed.

The effects of oxygen concentration (2.0-8.0 vol %) in the flue gas and the combustion temperature (800-900° C.) in the bed region on improving combustion performance were investigated. The results showed that CO concentration is significantly reduced by replacing the inert bed material with ilmenite ore with up to 30% and 13% CO reductions demonstrated when burning Highvale coat and Poplar River coal, respectively. The enhanced combustion was even more pronounced in the bed region, in particular under conditions with low $O_2$ in flue gas (2-8 vol %) or low bed temperature (800-900° C.).

The beneficial effects of the presence of an oxygen carrier in the fluid bed is more pronounced at higher pressure in oxy-pressurized fluidized bed combustion since pressurized FBC provides improved reactant mixing, a longer residence time and higher reaction rates of oxygen carrier with hydrogen, carbon monoxide and hydrocarbons.

Although the present invention has been described in considerable detail with reference to certain preferred embodiments thereof, other embodiments and modifications are possible. Therefore, the scope of the appended claims should not be limited by the preferred embodiments set forth in the examples, but should be given the broadest interpretation consistent with the description as a whole.

The invention claimed is:

1. A process for obtaining heat from combustion of a fuel comprising the steps of:
   i) providing a combustion chamber comprising a fluidized bed material and means for transferring heat out of the combustion chamber;
   ii) introducing the fuel and a gas into the combustion chamber;
   iii) introducing a sorbent into the combustion chamber wherein said sorbent is capable of adsorbing sulphur containing compounds;
   iv) producing a gas stream comprising primarily of $CO_2$ and $H_2O$ by combustion of the fuel; and
   v) transferring the heat produced by the combustion of the fuel out of the combustion chamber;
      wherein the bed material comprises at least a first material comprising particles having a first minimum transport velocity and a second material comprising particles having a second minimum transport velocity, and wherein the minimum transport velocity of the particles of the first material is greater than the minimum transport velocity of the particles of the second material;
      wherein the first material comprises an oxygen carrier capable of transferring oxygen to and from the gases in the combustion chamber generated by the localized or distributed partial oxidation of the fuel;
      wherein the second material comprises the sorbent;
      wherein the gas introduced into the combustion chamber comprises oxygen and a moderating gas; and
      wherein introduction of the gas into the combustion chambers fluidizes the bed material and elutriates a portion of the sorbent.

2. The process according to claim 1, wherein the fuel is selected from a group consisting of coal, petroleum coke, biomass, waste products, and gaseous hydrocarbons.

3. The process according to claim 1, wherein the first material further comprises a support material for the oxygen carrier.

4. The process according to claim 3, wherein the support material for the oxygen carrier is at least one of alumina and silica.

5. The process according to claim 1, wherein the oxygen carrier is selected from the group consisting of ilmenite, and synthetic materials composed of Ni, Cu, Mg, Mn, or Fe.

6. The process according to claim 1, wherein the moderating gas comprises one or more gases selected from the group consisting of $CO_2$, $H_2O$, and recycled flu gas.

7. The process according to claim 1, wherein the sorbent is selected from the group consisting of limestone, lime, calcium hydroxide, and dolomite.

8. The process according to claim 1, wherein the step of transferring the heat produced by combustion of the fuel out of the combustion chamber is performed by heat exchangers in the combustion chamber.

9. The process according to claim 1, wherein the gas introduced into the combustion chamber elutriates ash formed by combustion of the fuel.

10. The process according to claim 9, wherein the combustion chamber is pressurized to a pressure between 1 and 50 bar.

11. An apparatus for combustion of a fuel comprising:
   i) a combustion chamber;
   ii) a bed material comprising at least a first material and a second material;
   iii) means for introducing oxygen into the combustion chamber with or without a moderating gas;
   iv) means for introducing the fuel into the combustion chamber;
   v) means for capturing carbon dioxide gas produced in the combustion chamber;
   vi) means for transferring heat produced by combustion of the fuel out of the combustion chamber;
   vii) means for introducing the first material and the second material into the combustion chamber; and
   viii) means for removing a portion of the second material which is elutriated by the gas introduced into the chamber;

wherein the first material comprises particles having a first minimum transport velocity and the second material comprising particles having a second minimum transport velocity, and wherein the minimum transport velocity of the particles of the first material is greater than the minimum transport velocity of the particles of the second material;

wherein the first material comprises an oxygen carrier capable of transferring oxygen to and from gases in the combustion chamber generated by the localized or distributed partial oxidation of the hydrocarbon fuel;

wherein the second material comprises a sorbent which is capable of adsorbing sulphur containing compounds; and wherein the means for introducing the oxygen and optionally the moderating gas is arranged such that introduction of the oxygen and optionally the moderating gas into the combustion chamber fluidizes the bed material and elutriates the portion of the second material.

12. The apparatus according to claim 11, wherein the fuel is selected from a group consisting of coal, petroleum coke, biomass, waste products, and gaseous hydrocarbons.

13. The apparatus according to claim 11, wherein the first material further comprises a support material for the oxygen carrier.

14. The apparatus according to claim 13, wherein the support material for the oxygen carrier is at least one of alumina and silica.

15. The apparatus according to claim 11, wherein the oxygen carrier is selected from the group consisting of ilmenite, and synthetic materials composed of Ni, Cu, Mg, Mn, or Fe.

16. The apparatus according to claim 11, wherein the moderating gas comprises one or more gases selected from the group consisting of $CO_2$, $H_2O$, and recycled flu gas.

17. The apparatus according to claim 11, wherein the sorbent is selected from the group consisting of limestone, lime, calcium hydroxide, and dolomite.

18. The apparatus according to claim 11, wherein the means for transferring heat produced by combustion of the fuel out of the combustion chamber is heat exchangers in the combustion chamber.

19. The apparatus according to claim 11, wherein the gas introduced into the combustion chamber elutriates ash formed by combustion of the fuel.

20. The apparatus according to claim 19, wherein the combustion chamber is pressurized to a pressure between 1 and 50 bar.

* * * * *